United States Patent Office 2,861,974
Patented Nov. 25, 1958

2,861,974

INTERPOLYMERS OF STYRENE WITH ELASTOMERIC TRIPOLYMERS AND METHOD OF PREPARATION

John L. Lang, Midland, Mich., assignor to The Dow Chemical Company, Midland, Mich., a corporation of Delaware No Drawing. Application February 17, 1956
Serial No. 566,080

7 Claims. (Cl. 260—45.5)

This invention relates to grafted interpolymers which are comprised of styrene and elastomeric ternary copolymers containing a vinylidene halide as a copolymerized constituent. The invention has particular reference to the potentially high elongation compositions which may be obtained with such grafted interpolymers. It is also concerned with a method for their preparation.

Grafted copolymers and interpolymers, as conventionally understood, are the interpolymeric products which result when a monomeric substance is polymerized in the presence of a preformed polymeric material. Such products cannot be separated into all of their constituent parts by physical methods and may further be characterized as having a substantially heterogeneous molecular structure in which a nonstatistical distribution of the interpolymerized materials is obtained due to the arrangement of chemically linked chains of different polymeric materials.

It is known to improve the characteristics of compositions comprised of polymers and copolymers of styrene and the like in combination with elastomeric or rubberlike polymeric materials by employing chain transfer agents which, in effect, form chemically linked structures of the diverse polymeric materials. However, the employment of chain transfer agents, which frequently contain reactive halogen constituents is usually inconvenient and beset with difficulty. For example, most effective chain transfer agents are extremely corrosive and must be handled with great care while using extraordinary equipment in order to cope with this propensity. It would be advantageous for improved compositions to be available which had properties commensurate with or superior to the conventional chain transferred styrene-rubber compositions without involving the difficulties and inconveniences which may be experienced with the use of many chain transfer agents.

Such desiderata and other advantageous results and benefits may be realized according to the present invention which comprises a grafted interpolymer of (1) styrene, which has been interpolymerized with (2) an elastomeric ternary copolymer of a monovinyl aromatic substance, an aliphatic conjugated diolefine and a vinylidene halide, which grafted interpolymeric composition contains between about 85 and 99 percent by weight of styrene polymerized with the ternary copolymer. Advantageously, the interpolymer contains about 5 percent by weight of the ternary copolymer interpolymerized with styrene in its molecule. The interpolymers may be obtained by polymerizing monomeric styrene in the presence of the ternary copolymer. Polystyrene may be formed and present in varying amounts in the compositions along with the interpolymers, depending upon the particular reaction conditions involved.

While the polymerization may be accomplished in various ways, it is advantageous to employ ordinary emulsion polymerization techniques with aqueous emulsions of the interpolymerizable constituents and while utilizing conventional catalysts, emulsifiers and other commonly employed operating conditions. The vinylidene halide constituent of the elastomeric ternary copolymer facilitates the interpolymerization by functioning as an integral chain transfer site in the ternary copolymeric molecule and, since it is part of an otherwise substantially hydrocarbon macromolecule, does not involve the difficulties which are present when a corrodent is employed as a chain transfer agent for linking already polymerized materials.

The grafted interpolymers of the present invention have an improved viscosity and better flow values in comparison with the conventionally-obtained, chain transferred styrene-rubber compositions. They may also be fabricated by extrusion with a minimized occurrence of interfering heterogeneity caused by local gellation. They may be employed advantageously for various high elongation compositions. While it is known to form interpolymers of styrene and different types of elastomeric polymers, and copolymers, the materials thereby obtained, as will be illustrated, are not the equivalent of the grafted interpolymers of the present invention.

Advantageously, although other proportions may also be employed, the elastomeric ternary copolymer may be comprised of an amount of the conjugated diolefine in the neighborhood of about 75 percent by weight and between about 0.5 and 20 and, more advantageously, between about 1 and 10 percent by weight of the vinylidene halide with the balance of the copolymerized constituents consisting of the monovinyl aromatic substance.

Styrene may advantageously be utilized as the monovinyl aromatic substance in the elastomeric ternary copolymer although, if desired, such monomeric substances as ortho-, meta-, and para-methyl styrene, ortho-, meta-, and para-ethyl styrene, para isopropyl styrene, vinyl naphthalene and the like or mixtures thereof may be employed. The aliphatic conjugated diolefines which may be used in the ternary copolymer include those having from four to six carbon atoms in their molecules such as butadiene-1,3; isoprene; 2,3-dimethylbutadiene-1,3; and such substituted conjugated diolefines as 2-chlorobutadiene and the like; or mixtures thereof. Butadiene may advantageously be utilized. Vinylidene chloride is preferably employed as the vinylidene halide constituent of the ternary copolymer although other vinylidene halides which do not contain fluorine may also be used including vinylidene bromide, vinylidene chlorobromide and the like. Mixtures of vinylidene halides may also be employed. As employed throughout the present specification and in the hereto appended claims, the term vinylidene halide is intended to be exclusive of fluorine.

In a series of illustrative examples, which are not to be construed as being limiting or restrictive of the invention, a group of elastomeric ternary copolymers were prepared with a constant amount of butadiene (75 percent by weight) in each combined with varied proportions of styrene and vinylidene chloride. Each of the copolymers was prepared in 12 ounce citrate bottles by an emulsion polymerization technique using about 5 parts by weight of the monomeric substances to be copolymerized with about 9 parts by weight of an emulsifier consisting of about 90 parts by weight of water; 2.5 parts by weight of sodium stearate; 0.15 part by weight of potassium persulfate; and 0.25 part by weight of $C_{12}$ mercaptans. The polymerization of each of the ternary copolymers was accomplished in a tumbling bath at a temperature of about 50° C. in a period of about 24 hours. After being coagulated from the resulting latex and dried, each of the elastomeric ternary copolymers was interpolymerized with styrene, while sealed in standard No. 3 metal cans, to provide a graft interpolymer containing about 5 percent by weight of the ternary copolymer in the interpolymer molecule. About 1 percent by weight of soya bean oil as an internal flow agent, 1 percent by weight of butyl stearate as a mold release agent, and 0.03 percent by weight of benzoyl peroxide as a catalyst was incorporated in each of the interpolymerizing masses so that they actually contained about 93 percent by weight of styrene polymerized in the interpolymer molecule. The interpolymerizations to form the graft interpolymers were conducted at a temperature of about 90° C. for a period of several days. After the interpolymerization was completed each of the graft interpolymer products was heat treated at a temperature of about 150° C. for an additional three day period in order to carry the polymerization essentially to completion.

By way of illustrating the typical preparation of the graft interpolymers in the described manner, about 8 grams of one of the elastomeric ternary copolymers was dissolved in about 188.8 grams of styrene to which solution is added about 1.6 grams of soya oil, 1.6 grams of butyl stearate and 0.048 gram of benzoyl peroxide. The polymerization was conducted for 23 days at 90° C. after which the product graft interpolymer was heat treated for 3 days at 150° C., at which point it was cooled and fabricated into various standard bar shaped articles suitable for testing.

The following table, in samples B through H, includes details on the compositions of the ternary copolymers which were employed as well as data on the product graft interpolymers and some of the physical properties of each of the products. Sample A was prepared and tested in a similar manner for purposes of comparison with an interpolymerized binary copolymer. The physical properties were obtained by means of conventional and accepted test analyses upon standard test pieces fabricated from the grafted interpolymer products.

| Sample | Composition of Ternary copolymer containing 75 percent by wt. Butadiene | | Polymerization Time at 90° C. for Graft Interpolymer, days | Tensile Strength, p. s. i. of Composition | Elongation percent of Composition | Heat Distortion Point, ° C. of Composition |
|---|---|---|---|---|---|---|
| | Percent by wt. Styrene | Percent by wt. VeCl₂ * | | | | |
| A | 0.0 | 25.0 | 23 | 4,280 | 6.5 | 68 |
| B | 5.0 | 20.0 | 23 | 3,990 | 8.5 | 64 |
| C | 15.0 | 10.0 | 5 | 4,200 | 13.7 | 73 |
| D | 17.5 | 7.5 | 23 | 4,410 | 22.0 | 69 |
| E | 20.0 | 5.0 | 23 | 4,350 | 16.5 | 69 |
| F | 22.5 | 2.5 | 23 | 4,500 | 28.2 | 70 |
| G | 24.0 | 1.0 | 23 | 4,290 | 17.0 | 68 |
| H | 24.5 | 0.5 | 23 | 4,260 | 16.1 | 71 |

* VeCl₂ is vinylidene chloride.

As is apparent upon comparison of Sample A with the others, the composition comprised of the grafted interpolymer of styrene and an elastomeric vinylidene chloride-butadiene binary copolymer had comparable tensile strength and heat distortion characteristics but a significantly lower elongation. A composition comprising a similar graft interpolymer with styrene and a rubbery styrene-butadiene binary copolymer also had inferior elongating characteristics as compared to the graft interpolymers of the present invention.

What is claimed is:
1. Graft copolymer compositions having relatively high elongation characteristics which consists essentially of (1) styrene which has been interpolymerized with (2) an elastomeric ternary copolymer of a monofunctional monovinyl aromatic substance selected from the group consisting of styrene, the several alkyl substituted styrenes, vinyl naphthalene and their mixtures, an aliphatic conjugated diolefine, and a vinylidene halide containing a halogen of atomic number from 17 to 35; which graft copolymer composition contains between 85 and 99 percent by weight of styrene polymerized with the ternary copolymer.

2. Graft copolymer compositions having relatively high elongation characteristics which consists essentially of (1) styrene which has been interpolymerized with (2) an elastomeric ternary copolymer of styrene, butadiene and vinylidene chloride; which graft copolymer composition contains between 85 and 99 percent by weight of styrene polymerized with the ternary copolymer.

3. The composition of claim 2 wherein the ternary copolymer contains about 75 percent by weight of butadiene polymerized in its molecule.

4. The composition of claim 2 wherein the ternary copolymer contains about 75 percent by weight of butadiene and between about 0.5 and 20 percent by weight of vinylidene chloride polymerized in its molecule.

5. The composition of claim 2 wherein the ternary copolymer contains about 75 percent by weight of butadiene and between about 1 and 10 percent by weight of vinylidene chloride polymerized in its molecule.

6. The composition of claim 2 wherein the graft copolymer contains about 5 percent by weight of the ternary copolymer polymerized in said graft copolymer molecule.

7. Method for preparing graft copolymers adapted to provide relatively high elongation compositions which comprises polymerizing between 85 and 99 parts by weight of styrene in the presence of between about 1 and 15 parts by weight of an elastomeric ternary copolymer of styrene, butadiene and vinylidene chloride.

References Cited in the file of this patent
UNITED STATES PATENTS
2,755,270  Hayes _____ July 17, 1956